(12) United States Patent  (10) Patent No.: US 8,381,371 B2
Ramsauer  (45) Date of Patent: Feb. 26, 2013

(54) CLIP FIXING ASSEMBLY FOR FIXING A FITTING TO A THIN WALL PROVIDED WITH OPENINGS

(76) Inventor: Dieter Ramsauer, Schwelm (DE)

( * ) Notice: Subject to any disclaimer, the term of this patent is extended or adjusted under 35 U.S.C. 154(b) by 689 days.

(21) Appl. No.: 11/921,120

(22) PCT Filed: Mar. 11, 2006

(86) PCT No.: PCT/EP2006/002257
§ 371 (c)(1),
(2), (4) Date: Nov. 27, 2007

(87) PCT Pub. No.: WO2006/128505
PCT Pub. Date: Dec. 7, 2006

(65) Prior Publication Data
US 2009/0151136 A1 Jun. 18, 2009

(30) Foreign Application Priority Data
May 27, 2005 (DE) .................. 20 2005 008 466 U

(51) Int. Cl.
*F16B 5/06* (2006.01)
(52) U.S. Cl. ............... 24/458; 24/289; 24/292; 24/453; 411/516
(58) Field of Classification Search ............ 24/297, 24/289, 291, 292, 293, 294, 295, 458, 453; 70/370; 411/970, 516; 248/220.31
See application file for complete search history.

(56) References Cited

U.S. PATENT DOCUMENTS

| | | | |
|---|---|---|---|
| 3,046,777 A * | 7/1962 | Schlage | 70/371 |
| 3,645,160 A | 2/1972 | Artiolo et al. | |
| 5,435,159 A | 7/1995 | Ramsauer | |
| 6,161,404 A | 12/2000 | Westwinkel | |
| 6,497,011 B2 * | 12/2002 | Smith et al. | 24/295 |
| 6,568,229 B1 * | 5/2003 | Heinrich | 70/370 |
| 7,300,089 B2 * | 11/2007 | Kuroda | 296/39.1 |
| 2003/0079316 A1 * | 5/2003 | Ogawa | 24/297 |

FOREIGN PATENT DOCUMENTS

| | | |
|---|---|---|
| DE | 295 06 488.9 | 6/1995 |
| FR | 2 748 073 | 10/1997 |
| GB | 1 074 952 | 7/1967 |
| GB | 1 128 404 | 9/1968 |
| WO | 02/02954 | 1/2002 |

* cited by examiner

*Primary Examiner* — Robert J Sandy
*Assistant Examiner* — Michael Lee
(74) *Attorney, Agent, or Firm* — Frommer Lawrence & Haug LLP

(57) ABSTRACT

The description relates to a clip fastening for fastening fitting parts such as locks, hinges, grips and/or for fastening thin-walled structural component parts provided with an opening to a thin wall, such as a sheet-metal cabinet door, provided with an opening or openings, comprising a head part with a flange which overlaps the outer rim or edge of the opening after assembly, and a body part which proceeds from the head part and extends through the opening after assembly, a substantially U-shaped spring being held at the end of the body part and supported by its leg ends on the inner edge of the opening. According to the invention, the spring is a flat structural component part with U-legs that are cut off or shaped at the free end substantially at right angles to the running direction of the U-leg in such a way that they are supported on the rim or edge of the opening after assembly at a slight inclination to the plane of the thin wall.

12 Claims, 5 Drawing Sheets

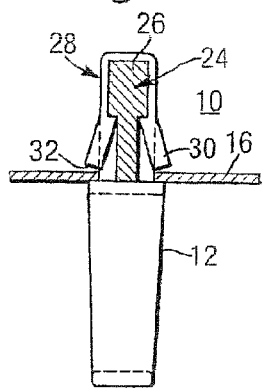
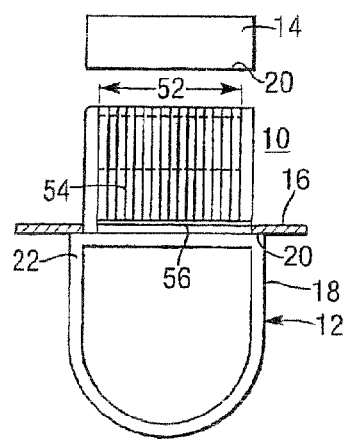
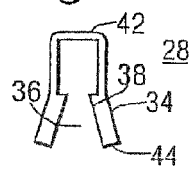
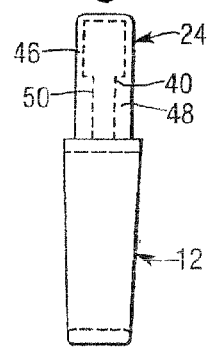
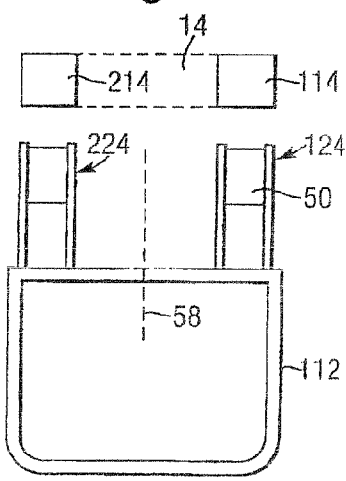
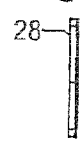
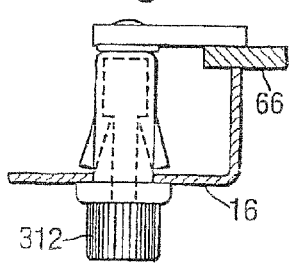
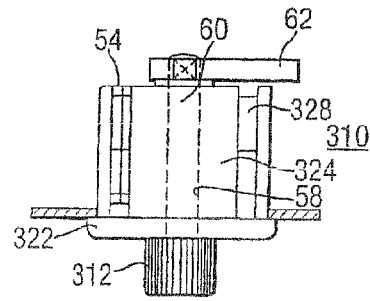
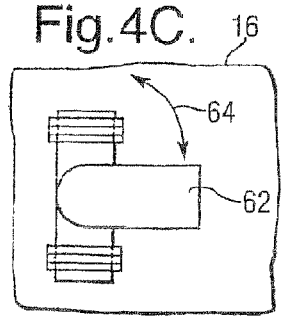

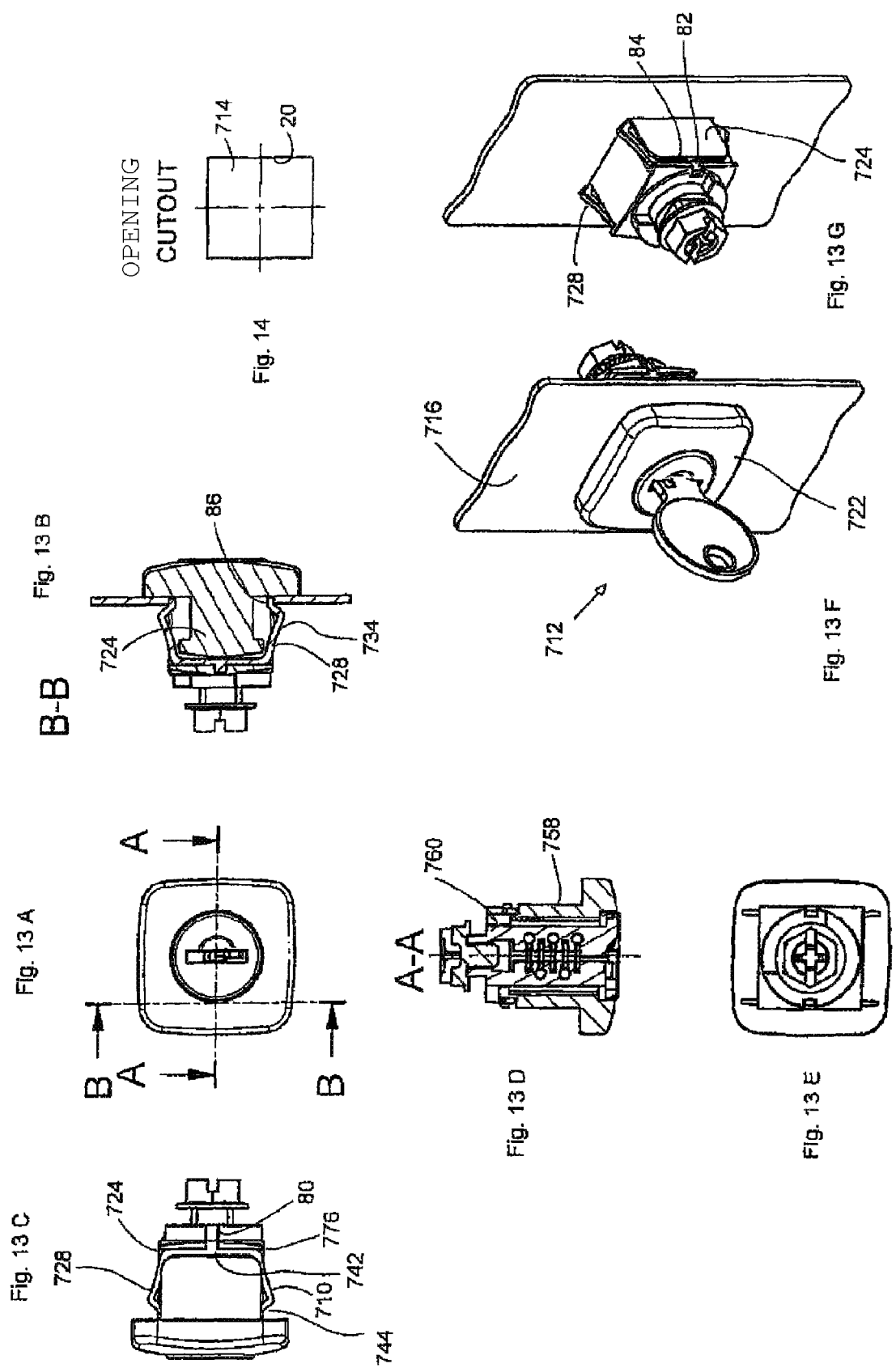

Fig. 15 B
Fig. 15 G
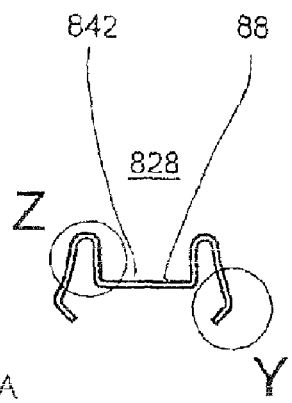
Fig. 15 A
Fig. 15 C
Fig. 15 F
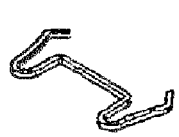
Fig. 15 D
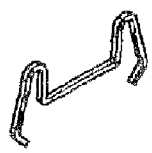
Fig. 15 E

CLIP FIXING ASSEMBLY FOR FIXING A FITTING TO A THIN WALL PROVIDED WITH OPENINGS

CROSS-REFERENCE TO RELATED APPLICATIONS

This is a national phase application of International Application No. PCT/EP2006/002257, filed Mar. 11, 2006 which claims priority of German Application No. 20 2005 008 466.2, filed May 27, 2005, the complete disclosures of which are hereby incorporated by reference.

BACKGROUND OF THE INVENTION a) Field of the Invention

The invention is directed to a clip fastening for fastening fitting parts such as locks, hinges, grips and/or for fastening thin-walled structural component parts provided with an opening to a thin wall, such as a sheet-metal cabinet door, provided with an opening or openings, comprising a head part with a flange which overlaps the outer edge or rim of the opening after assembly, and a body part which proceeds from the head part and extends through the opening after assembly, a substantially U-shaped spring being held at the end of the body part and supported by its leg ends on the inner edge of the opening, wherein the spring is a flat structural component part with U-legs that are cut off at the end substantially at right angles to the running direction in such a way that they are supported on the rim or edge of the opening after assembly at a slight inclination to the plane of the thin wall.

b) Description of the Related Art

U.S. Pat. No. 5,435,159 already discloses a clip fastening for a latch lock in which the lock housing has a head part with a flange that overlaps the outer edge of the opening after assembly and which further has a body part proceeding from the head part and extending through the opening after assembly, a spring which is U-shaped in cross section and which is supported by its leg ends on the rim area of the opening and also partially on the inner edge of the opening being held at the end of the body part (see, for example, FIG. 28 of the reference). However, the shape of the spring is disadvantageous insofar as it occupies considerable space and requires complicated stamping devices.

OBJECT AND SUMMARY OF THE INVENTION

It is the primary object of the invention to overcome the disadvantages of the known clip fastening and, further, to enable a more universal application.

The object is met according to the invention in that the spring is a flat structural component part having a U-shaped profile viewed from the top and U-legs which are cut off or shaped at the free end substantially at right angles to the running direction in such a way that they are supported on the rim or edge of the opening at a slight inclination to the plane of the thin wall when assembled.

The U-legs can initially extend in a parallel manner from the U-web with a first, small width and then, starting at the projections, with a second, greater width and such that their distance relative to one another increases.

The spring can have a thickness of from 0.5 mm to 0.8 mm. Therefore, the spring can be mounted in an extremely small installation space.

The clip fastening can be shaped in such a way that the U-web forms a U-shaped recess area.

Aside from the advantages already mentioned, there is the further advantage that there are possible embodiment forms which make it possible to adapt to given conditions in an even more precise manner. Accordingly, it is possible that the body part has grooves that are located opposite one another, which grooves form the recess and can have a depth such that the U-legs are capable of receiving at least one spring at least during the assembly process.

It is also particularly advantageous that the groove or channel can have a width such that a bundle of a plurality of flat springs arranged next to one another can be received.

Owing to this bundling, the holding forces can be adapted as needed in that a certain quantity of flat springs is allotted to the bundle or bundles.

But it is also possible to adapt the range of thickness of the sheet metal to which the fitting, e.g., a grip, is to be mounted. For this purpose, flat springs are simply bundled for different clamping ranges so that the sheet-metal thickness tolerance or sheet-metal thickness range is increased by a multiple.

A further advantage consists in the ease of producing the body part onto which the flat spring can be fitted (from above) or pushed in and out (from the side). The body part onto which the flat spring can be fitted opens out either on both sides into a flange which prevents sliding out laterally on both sides or on at least one side, preferably an outer side, wherein a sliding out on the inner side is also prevented in this case by suitable means such as a limited extension of the respective opening, or gluing or welding at least the final spring element to the body part.

The outer cross section of the body part with the spring fitted thereto and the respective opening in the thin wall are preferably rectangular.

In particular, the body part can form an elongated rectangle and can be a bearing for the shaft of a latch that can be actuated by means of a knob or a wrench, wherein space is provided on both sides of the bearing for at least one groove for a flat spring or for a bundle of flat springs.

But the body part can also be an elongated rectangle and can form a head with a finger grip or handle. Further, the body part can form an elongated or substantially equilateral rectangle and the distance between the support surface of the flange-like head part and the support surface of the spring end can be increased in such a way that two thin walls can be connected to one another.

Further, it is possible that the body part forms an elongated or substantially equilateral rectangle and the associated head part is the supporting point for one end of a grip.

Finally, it is possible that the body part forms an elongated or substantially equilateral rectangle and the associated head part is part of a hinge.

BRIEF DESCRIPTION OF THE DRAWINGS

The invention will be explained more fully in the following with reference to embodiment examples shown in the drawings.

FIGS. 1A, 1B and 1C show different views of a grip which is outfitted by means of the clip fastening according to the invention FIGS. 2A and 2B show the respective flat spring, a plurality of which may be placed next to one another to use as a bundle, with FIG. 2A showing a front view if the flat spring and Fig 2B showing a side view of the flat spring;

FIG. 3 shows a handle part suitable for the spring in FIG. 2A;

FIGS. 4A and 4B show two views of a latch lock which can be fastened by means of the holding part according to FIG. 2A;

FIG. 4C shows a view from below of the latch lock according to FIG. 4A;

FIG. 10 shows a spring element which is suitable for pushing on; and

FIGS. 13A to 13E show different views of a cylinder lock with a latch tongue by means of two flat springs in a square opening in a thin wall;

FIGS. 13F and 13G show a perspective view from the front (FIG. 13F) and from the rear (FIG. 13G) of the lock (the latch tongue is omitted) which is installed in an opening in a thin wall;

FIG. 14 shows the associated opening (installation opening);

FIGS. 15A to 15E show different views of a flat spring similar to the spring used in FIGS. 13A to 13G, but with a U-web which is bent in a U-shaped manner; and FIGS. 15F and 15G show enlarged details of positions Y and Z from FIG. 15A.

DESCRIPTION OF THE PREFERRED EMBODIMENTS

Figure 5:
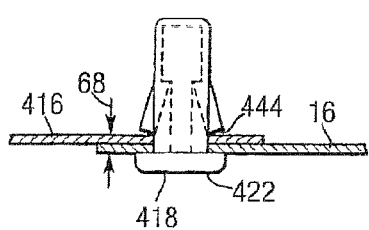
FIG. 5 shows a connector for two sheet-metal sheets which is outfitted with the spring device from FIG. 2A.
Figure 6:
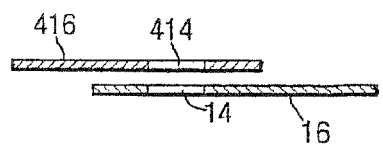
FIG. 6 shows the two sheet-metal sheets before connecting.

FIGS. 1A and 1B show side views in 90-degree rotation of a clip fastening 10 for fastening fitting parts such as locks and hinges such as for a grip 12 in a thin wall 16, such as a sheet-metal cabinet door, provided with an opening which serves as an installation opening 14. The clip fastening 10 comprises a head part 18 with a flange 22 which overlaps the outer rim 20 or edge of the opening 14 after assembly and further comprises a body part 24 which proceeds from the head part and extends through the opening 14 after assembly. A spring 28 which is U-shaped when viewed from above is held at the end 26 of the body part 24 and is supported on the inner edge 32 of the opening 14 by its leg ends 30. The U-shaped spring 28 has resiliently flexible projections 38 which project from the U-legs 34 into the interior of cavities 36 enclosed by the legs 34. The projections 38 can be received in a positive engagement by corresponding recesses 40 of the body part 24 after assembly.

As can be seen particularly from FIGS. 2A and 2B, the spring 28 is a flat structural component part having a U-profile considered from the top with U-legs 34 which initially extend in a parallel manner from the U-web 42 with a first, small width and then, starting in the region of the projections 38, with a second, greater width and whose distance from one another increases and which are cut off (see FIG. 2A, reference number 44) at the end substantially at right angles to the running direction in such a way that they are supported on the rim 32 of the opening after assembly, as shown in FIG. 1A, at a slight inclination to the plane of the thin wall 16.

As can be seen from FIG. 1C, the body part has oppositely located grooves 46, 48 which form the recess 40 through the change in the groove base 50 and have a depth such that they are capable of receiving the U-legs 34 of at least one spring 28 at least during the assembly process.

The groove 48 can have a width 52 such that a bundle 54 comprising a plurality of flat springs 28 lying next to one another can be received, as can be seen in FIG. 1B, where a whole series of flat springs 24 forms a common fastening and supporting surface 58. Since the individual legs of the individual springs can move independently from one another, adapting to the rim of the opening is facilitated even when there is unevenness in the rim. This results in a particularly stable fastening with an overall lower surface pressing than in the prior art.

This also makes it possible to use non-metallic materials such as plastic for the thin wall.

The body part 24 with the spring bundle 52 can also be divided as is shown in FIG. 3A so that it is possible to arrange a shaft 60 or other arrangements between the two body regions 124, 224, indicated by a dashed line 58 in FIG. 3, each of which forms its own groove 50 in which a bundle of flat springs 28 can be inserted, not shown. Instead of an elongated opening 14 for receiving the two body regions 124, 224 of the grip 112, two installation openings 114, 214 which are substantially narrower and just suffice to receive the body regions 124, 224 could also be used.

An application of this principle is shown in FIGS. 4A, 4B and 4C which show a latch lock 312 whose housing has a rectangular shape and is mounted in a corresponding elongated opening in a door leaf 16 (see FIG. 4A).

The body part 324 forms a bearing 58 for a shaft 60 of a latch lock which can be actuated by a knob 312 or a wrench and whose latch bolt 62 may be swivelable, for example, by 90° in direction of the arrow 64 and can be moved into a holding position in which, according to FIG. 4A, the door leaf 16 can be secured in a door frame 66. According to FIG. 4B, there is space on both sides of the bearing 58 for at least one groove 328 for a flat spring 28 or for a bundle 54 of flat springs 28.

The body part can form a substantially equilateral rectangle and the distance between the support surface of the flange-like head part 422 and the support surface 44 of the end of the spring bundle 454 can be increased (see reference number 66) in such a way that two thin walls 16, 416 are connected to one another.

Owing to the bundling, the holding forces can be adapted precisely to the requirements as needed in that only a certain quantity of flat springs is allotted to the bundle or bundles.

But it is also possible to adapt the range of thickness of the sheet metal to which the fitting, e.g., grip, is to be mounted. For this purpose, flat springs with a thickness of only 0.5 mm to 0.6 mm are simply bundled for different clamping ranges so that the sheet-metal thickness tolerance or sheet-metal thickness range is increased by a multiple.

Figure 8:
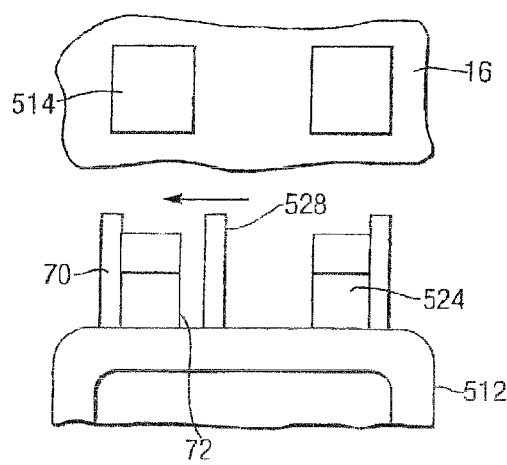
FIG. 8 shows an alternative embodiment form which works with spring elements which can be pushed on from the sides.
Figure 7A:
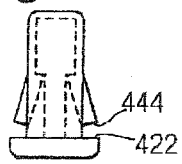
FIGS. 7A and 7B show two views of the connector device suitable for connecting.
Figure 7B:
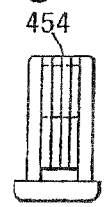
Figure 10:
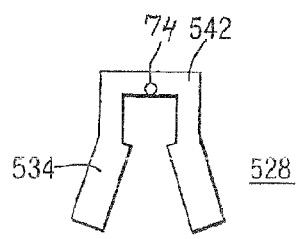
Figure 9:
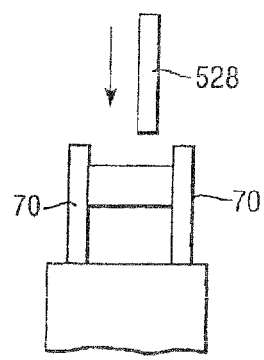
FIG. 9 shows an embodiment form which works with a spring element that can be pushed on from above.
Figure 11A:
FIGS. 11A and 11B show another embodiment form of a flat spring.
Figure 11B:
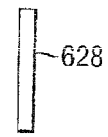
Figure 12B:
FIGS. 12A and 12B show an application with a grip.
Figure 12A:
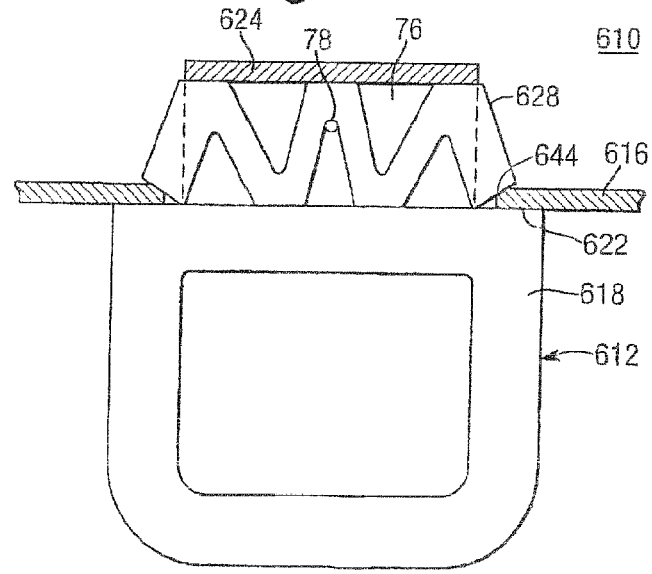

A further advantage consists in that the body part 24, 524 onto which the flat spring 528 (FIG. 10) can be fitted (from above referring to FIG. 9) or pushed on (from the side referring to FIG. 8) is simple to produce. The body part 524 onto which the flat spring 528 can be fitted opens out either on both sides into a flange 70 which prevents the spring(s) 528 from sliding out laterally on both sides (see FIG. 9) or at least on one side, preferably an outer side, as is shown in FIG. 8. Sliding out is prevented on the side 72 where no flange 70 is provided by other suitable means such as a limited extension of the respective opening 514, by gluing or welding at least the final spring element of a bundle to the body part, or by flattening a portion 74 of the spring 528 in the region of or in the vicinity of the web 542 in order to clamp the spring to the body part.

The body part is also easy to produce by injection molding insofar as injection dies without slides can be used, a parted die is sufficient.

It should also be noted that a wing of a hinge can also take the place of the flange-like head region 422 instead of a handle or finger grip.

As has already been mentioned, it is possible for the fitting to have other shapes as well. While the U-web in the embodiment forms according to FIGS. 1A to 10 forms a substantially straight line, it is also possible to implement an embodiment form in which the (straight) web is shortened until the U-shape becomes a V-shape (not shown).

On the other hand, the U-web can also have an M-shape, or the V-shape can be widened into an M-shape (inverted W-shape) by adding legs on both sides as is shown in FIGS. 11A to 12B.

The V-shape or M-shape can be fastened by a body part 624 with a channel 76 into which the flat spring or the bundle of flat springs can be inserted. Lateral securing can be carried out by projections 78 extending into the channel or pin devices crossing the channel. The legs with the support surfaces 644 then exit from the ends of the V or M.

A latch lock 712 (latch not shown) which is provided with a cylinder lock and which can be mounted by means of two flat springs 728 in a preferably square opening 714 (FIG. 14) in a thin wall 716 is shown in different views FIGS. 13A to 13E. It is shown in a perspective view mounted from the front in FIG. 13F and from the rear in FIG. 13G.

The fastening shown in FIGS. 13A to 13E is characterized in that a projection 80 exits from the U-web 742 of the U-shaped holding spring 728 and extends away from the U-web 742 in the direction opposite to the U-legs 734 (namely in the direction of the rear end of the lock 712). The projection 80 of the two springs 728 which is insertable into a lateral groove 84 from both sides of the latch shaft 760 is received in recesses 82 of the body part 724 so that the spring cannot slide out of the groove. Further, in the mounted position the opening 714 prevents the spring 728 from sliding out by its edge 20 into which the bent end 86 of the spring 728 extends.

Another possibility for fastening the spring to the body part is shown in FIGS. 15A to 15E, where a flat spring similar to the spring used in FIGS. 13A to 13G but which is provided with a U-web that is bent in a U-shaped manner is shown in different views (see also the enlarged details of locations Y and Z of FIG. 15A shown in FIGS. 15F and 15G).

The clip fastening with the spring 828 according to FIGS. 15A to 15D, in which the U-web 842 with a U-shaped recess area 88 engages in a recess of the body part (not shown) in such a way that it is prevented from sliding out of the groove laterally, obviates the end 86 in the embodiment form 728 in FIGS. 13A to 13E, which end 86 extending into the opening 714.

While the foregoing description and drawings represent the present invention, it will be obvious to those skilled in the art that various changes may be made therein without departing from the true spirit and scope of the present invention.

REFERENCE NUMBERS 10, 610 clip fastening
12, 112, 312, 612 fitting part such as a lock, hinge, grip, knob
14, 514 opening
16, 416, 516, 616 thin wall, sheet-metal cabinet door
18, 418, 518, 618 head part
20 outer rim, edge
22, 422, 622 flange
24, 124, 224, 524, 324, 624 body part groove
26 end
28, 528, 628 spring
30 leg end
32 inner edge
34 U-leg
36 cavity
38 resiliently flexible projections
40 recess
42 U-web
44, 444, 644 cut-off end of spring, support surface
46 groove
48 groove
50 groove base
52 width
54, 454 bundle
56 supporting surface
58 bearing
60 shaft
70 flange
72 slide-on side
74 portion of the spring
76 channel
78 projection, pin

What is claimed is:

1. A clip fastening for fastening fitting parts and/or for fastening thin-walled structural component parts provided with an opening to a thin wall provided with an opening or openings, comprising:
   a head part with a flange which overlaps the outer rim or edge of the opening of the thin wall after assembly;
   a body part which proceeds from the head part and is configured to extend through the opening of the thin wall after assembly; and
   a substantially U-shaped spring being held at the end of the body part and supported by leg ends on the inner edge of the opening of the thin wall;
   wherein said U-shaped spring is a flat structural component part with a web, and U-legs that extend from the web and are cut off or shaped at respective free ends substantially at right angles to the running direction of the respective U-legs in such a way that the free ends are configured to be supported on the rim or edge of the opening of the thin wall after assembly at a slight inclination to the plane of the thin wall, the web and the U-legs each having a rectangular cross section the longer sides thereof being parallel to the plane of the structural component, whereby the free ends of the U-legs have a cross-section the longer side thereof being much longer than the extension perpendicular thereto;
   wherein said web and U-legs form a U-shaped cavity configured to be received by projections or recesses arranged in the body part;
   wherein the body part has a rectangular cross section configured to hold a spring bundle of two or more U-shaped springs in a side-by-side fashion; and
   wherein the U-shaped spring further comprises two shoulders which support the spring within the body part, each shoulder extending toward the other shoulder from approximately a middle part of each respective U-leg.

2. The clip fastening according to claim 1;
   wherein the web forms a substantially straight line.

3. The clip fastening according to claim 2;
wherein the flat spring, which is U-shaped from a plan view perspective, has resiliently flexible projections which project from the U-legs into the cavity enclosed by the legs, which projections are configured to be received in a positive engagement by corresponding recesses of the body part after assembly.

4. The clip fastening according to claim 1;
wherein the legs proceeding from the web initially extend parallel to one another with a first, small width and then, starting in the region of the projections, with a second, greater width and their distance relative to one another increases, and they arc cut off at the end substantially at right angles to the running direction in such a way that they are supported on the rim of the opening of the thin wall after assembly at a slight inclination to the plane of the thin wall.

5. The clip fastening according to claim 1;
wherein the body part has grooves that are located opposite one another, which grooves form a recess through the change in the depth of a base of the grooves and have a depth such that the recess is configured to receive the U-legs of at least one spring at least during the assembly process.

6. The clip fastening according to claim 1;
wherein the spring is held within a channel that is held or formed by the body part.

7. The clip fastening according to claim 6;
wherein the web of the spring is received and held in a groove which is laterally formed by the body part.

8. The clip fastening according to claim 1;
wherein the outer cross section of the body part and the respective opening in the thin wall are rectangular.

9. The clip fastening according to claim 1.
wherein the body part is an elongated rectangle and forms a head part with a finger grip or handle.

10. The clip fastening according to claim 1;
wherein the body part forms an elongated or substantially equilateral rectangle, and in that the distance between the support surface of the flange-like head part and the support surface of the spring end is increased in such a way that two thin walls can be connected to one another.

11. The clip fastening according to claim 1;
wherein the body part forms an elongated or substantially equilateral rectangle and the associated head part is the supporting point for one end of a grip.

12. The clip fastening according to claim 1;
wherein the U-shaped spring is held at the end of the body part such that the U-Shaped spring is arranged entirely outside of the thin wall when the clip fastening is fastened to the thin wall.

* * * * *